Patented Aug. 20, 1929.

1,725,054

UNITED STATES PATENT OFFICE.

JÜRGEN CALLSEN, OF ELBERFELD, GERMANY, ASSIGNOR TO WINTHROP CHEMICAL COMPANY, INC., OF NEW YORK, N. Y.

PROCESS FOR THE PRODUCTION OF HALOGENATED ALCOHOLS.

No Drawing. Application filed March 17, 1927, Serial No. 176,287, and in Germany June 19, 1926.

United States Letters Patent No. 1,572,742 patented February 9, 1926, describes a process for the production of halogenated alcohols involving the treatment of solutions of halogenated aldehydes in primary alcohols with alcoholates or halogenated alcoholates of aluminum or mixtures thereof.

The present invention is based upon the discovery that it is possible to replace the primary alcohols used in the patented process by secondary alcohols with certain advantages.

When secondary alcohols are used in this process, instead of primary alcohols, a better yield of halogenated alcohols is obtained and the reaction period is shorter. This shortened reaction period is of great importance in connection with these processes as the halogenated alcohols, such as tribromoethylalcohol, for instance, are very sensitive compounds which can be destroyed by an extended reaction period.

It is known that aldehydes dissolved in secondary alcohols can be reduced to the corresponding alcohols, see Zeitschrift fur angewandte Chemie 1926, page 138 et seq., but this known process only deals with halogen-free aldehydes and the lack of analogy as between the behaviors of halogenated aldehydes and halogen-free aldehydes did not favor a prediction that the known process would serve for the production of halogenated alcohols from the corresponding halogenated aldehydes. As to the differences between the behaviors of halogen-free aldehydes and halogenated aldehydes with respect to reduction it is noted that halogen-free aldehydes are reducible by means of magnesium alcoholates and magnesium halogen alcoholates, whereas the halogenated aldehydes are not reducible by these agents, see Annalen 444, page 238, paragraph 1. The fact that the halogenated aldehydes are reduced to halogenated alcohols quite smoothly and with excellent yields by treatment with aluminum alcoholates and aluminum halogen alcoholates and mixtures thereof in the presence of secondary alcohols was quite unexpected.

The following example illustrates the invention:

100 grams of bromal, $CBr_3$—CHO, are dissolved in 140 cc. of isopropyl alcohol, 40 grams of aluminum alcoholate are added and the whole is heated for about 8 hours to 115° C., an inert gas, e. g. hydrogen being passed through the mixture throughout the heating operation. After distilling off the isopropyl alcohol, the residue is acidified with dilute sulphuric acid and the tribromo ethyl alcohol which separates out as an oil is extracted with ether. By distillation and finally, if necessary, by recrystallization from ligroin it is obtained in the form of colorless crystals, melting at 80° C.

The process is applicable in an exactly similar manner to other halogenated aldehydes, as for example, chloral and likewise with the employment of other secondary alcohols.

I claim:

1. Process for the production of halogenated alcohols which comprises heating a halogenated aldehyde dissolved in a secondary alcohol with an alcoholate of aluminum.

2. Process for the production of halogenated alcohols which comprises heating a halogenated aldehyde dissolved in a secondary alcohol with a halogenated alcoholate of aluminum.

3. Process for the production of halogenated alcohols which comprises heating a mixture of a halogenated aldehyde dissolved in a secondary alcohol with an alcoholate of aluminum while contacting an inert gas with the mixture.

4. Process for the production of tribromoethylalcohol which comprises heating a mixture of bromal, dissolved in isopropyl alcohol with an alcoholate of aluminum while contacting hydrogen gas with the mixture.

In testimony whereof I have hereunto set my hand.

JÜRGEN CALLSEN.